US011455460B2

(12) United States Patent
Tao (10) Patent No.: US 11,455,460 B2
(45) Date of Patent: Sep. 27, 2022

(54) METHOD FOR DISPLAYING HANDWRITTEN NOTE IN ELECTRONIC BOOK, ELECTRONIC DEVICE AND COMPUTER STORAGE MEDIUM

(71) Applicant: ZHANGYUE TECHNOLOGY CO., LTD, Beijing (CN)

(72) Inventor: Hongtao Tao, Beijing (CN)

(73) Assignee: ZHANGYUE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/969,060

(22) PCT Filed: Jan. 29, 2019

(86) PCT No.: PCT/CN2019/073785
§ 371 (c)(1),
(2) Date: Dec. 3, 2020

(87) PCT Pub. No.: WO2019/154197
PCT Pub. Date: Aug. 15, 2019

(65) Prior Publication Data
US 2021/0141999 A1    May 13, 2021

(30) Foreign Application Priority Data
Feb. 12, 2018   (CN) .......................... 201810145893.7

(51) Int. Cl.
*G06F 17/00*     (2019.01)
*G06F 40/169*    (2020.01)
(Continued)

(52) U.S. Cl.
CPC .......... *G06F 40/169* (2020.01); *G06F 3/0483* (2013.01); *G06F 15/0291* (2013.01); *G06F 40/171* (2020.01); *G06V 30/333* (2022.01)

(58) Field of Classification Search
CPC .... G06F 40/169; G06F 40/171; G06F 3/0483; G06F 15/0291; G06K 9/00409
See application file for complete search history.

(56) References Cited

U.S. PATENT DOCUMENTS 7,747,943 B2 * 6/2010 Bargeron ............... G06F 40/169
715/235
8,181,103 B2 * 5/2012 Lin ....................... G06F 40/171
715/230
(Continued)

FOREIGN PATENT DOCUMENTS

CN        1838110 A    9/2006
CN      103092822 A    5/2013
(Continued)

OTHER PUBLICATIONS

International Patent Application No. PCT/CN2019/073785; Int'l Search Report; dated Apr. 30, 2019; 6 pages.

*Primary Examiner* — Mohammed H Zuberi
(74) *Attorney, Agent, or Firm* — BakerHostetler (57) ABSTRACT

The present disclosure discloses a method for displaying a handwritten note in an electronic book, a computing device and a computer storage medium. Wherein the handwritten note includes a handwritten text, and the method includes: acquiring a handwritten text input by a user, recording a specific word in the electronic book corresponding to the handwritten text and a relative position of the handwritten text with respect to the specific word: when format adjustment of words in the electronic book is monitored, determining a new position of the specific word after the format adjustment; obtaining a new display position of the handwritten text based on the new position of the specific word and the recorded relative position of the handwritten text with respect to the specific word; and determining a display (Continued)

manner of the handwritten text based on the new display position of the handwritten text.

16 Claims, 6 Drawing Sheets

(51) Int. Cl.
*G06F 40/171* (2020.01)
*G06F 3/0483* (2013.01)
*G06F 15/02* (2006.01)
*G06V 30/32* (2022.01)

(56) References Cited

U.S. PATENT DOCUMENTS

| | | | | |
|---|---|---|---|---|
| 8,250,463 | B2* | 8/2012 | Bargeron | G06K 9/222 715/232 |
| 9,026,932 | B1* | 5/2015 | Dixon | G06F 3/04883 715/776 |
| 9,251,130 | B1* | 2/2016 | Lynnes | G06F 40/169 |
| 9,256,588 | B1* | 2/2016 | Moscovich | G06F 40/171 |
| 9,430,141 | B1* | 8/2016 | Lu | G06F 3/04883 |
| 9,639,514 | B2* | 5/2017 | Inoue | G06K 9/2081 |
| 9,727,535 | B2* | 8/2017 | Maloney | G06F 3/04883 |
| 9,792,038 | B2* | 10/2017 | Gil | G06F 3/04842 |
| 9,846,688 | B1* | 12/2017 | Weight | G06F 40/103 |
| 10,210,256 | B2* | 2/2019 | Zhu | G06F 16/94 |
| 10,417,310 | B2* | 9/2019 | Biswas | G06K 9/00436 |
| 10,509,853 | B2* | 12/2019 | Shigeta | G06F 3/0481 |
| 10,778,928 | B2* | 9/2020 | Li | G06F 3/04842 |
| 10,853,560 | B2* | 12/2020 | Siegel | G06F 21/10 |
| 11,023,665 | B2* | 6/2021 | Kochhar | G06F 40/106 |
| 11,132,540 | B2* | 9/2021 | Angelov | G06K 9/222 |
| 2002/0049787 | A1* | 4/2002 | Keely | G06F 40/169 715/205 |
| 2006/0010396 | A1* | 1/2006 | Beezer | G06F 40/169 715/802 |
| 2006/0029296 | A1* | 2/2006 | King | G06Q 20/102 382/313 |
| 2006/0098899 | A1* | 5/2006 | King | G06Q 30/0643 382/305 |
| 2008/0168073 | A1* | 7/2008 | Siegel | G06F 16/58 |
| 2009/0063492 | A1* | 3/2009 | Meyyappan | G06F 3/0321 |
| 2010/0278453 | A1* | 11/2010 | King | G06F 40/197 715/230 |
| 2012/0001923 | A1* | 1/2012 | Weinzimmer | G06F 3/0481 345/173 |
| 2012/0102418 | A1* | 4/2012 | Joy | G06F 16/4393 726/30 |
| 2012/0192118 | A1* | 7/2012 | Migos | G06F 3/0483 715/863 |
| 2012/0310649 | A1* | 12/2012 | Cannistraro | G06F 16/685 704/260 |
| 2013/0021281 | A1* | 1/2013 | Tse | G06F 3/0483 345/173 |
| 2013/0117655 | A1* | 5/2013 | Bennett | G06F 40/197 715/229 |
| 2013/0185657 | A1* | 7/2013 | Gunawardena | G06F 16/48 715/753 |
| 2014/0115436 | A1* | 4/2014 | Beaver | G06F 40/197 715/229 |
| 2014/0164900 | A1* | 6/2014 | Zeng | G06F 40/169 715/230 |
| 2014/0245123 | A1* | 8/2014 | Pircher | G06F 40/169 715/232 |
| 2014/0289593 | A1* | 9/2014 | Krishnan | G06F 15/0291 715/201 |
| 2015/0007013 | A1* | 1/2015 | Toh | G06F 40/169 715/230 |
| 2015/0073923 | A1* | 3/2015 | Hafeez | G06F 40/169 705/14.73 |
| 2015/0100872 | A1* | 4/2015 | Beezer | G06F 3/0482 715/230 |
| 2017/0235449 | A1* | 8/2017 | Walters | G06F 3/0483 715/776 |

FOREIGN PATENT DOCUMENTS

| | | |
|---|---|---|
| CN | 104854545 A | 8/2015 |
| CN | 105446647 A | 3/2016 |
| CN | 108255386 A | 7/2018 |

* cited by examiner

METHOD FOR DISPLAYING HANDWRITTEN NOTE IN ELECTRONIC BOOK, ELECTRONIC DEVICE AND COMPUTER STORAGE MEDIUM

CROSS REFERENCE TO RELATED APPLICATIONS

This application is a National Stage of International patent application PCT/CN2019/073785, filed Jan. 29, 2019 which claims priority to Chinese Patent Application No. 201810145893.7, titled "Method for Displaying Handwritten Note in Electronic Book, Computing Device and Computer Storage Medium", filed on Feb. 12, 2018 with the State Intellectual Property Office of People's Republic of China, the entire contents of which are incorporated herein by reference.

TECHNICAL FIELD

The present disclosure relates to the field of electronic books, and in particular to a method for displaying a handwritten note in an electronic book, an electronic device and a computer storage medium.

BACKGROUD

With the continuous development of technology and society, electronic books are popular because of their energy-saving and environmental protection, various forms and low prices, etc. In order to improve the popularity of the electronic books and enhance experience for the users to use the electronic books, more and more electronic devices support the users to write a note in the electronic books in a handwritten manner. For example, a text (such as comments, impressions, etc.) for a certain word in an electronic book can be written in the handwritten manner in the line spacing under the certain word.

At present, when an electronic device displays a handwritten note, the position of the handwritten note in the screen of the electronic device is usually recorded, and in turn the handwritten note are displayed based on the recorded position.

Figure 1:
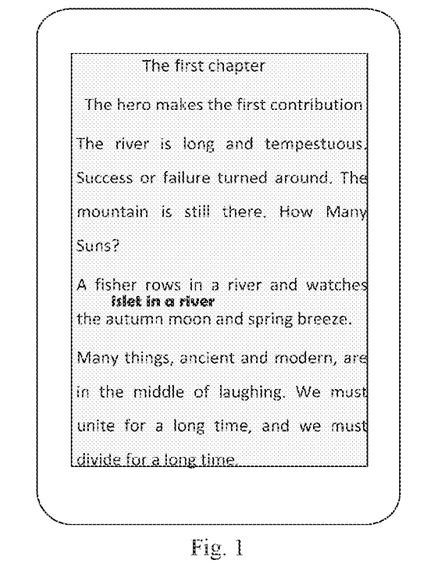
FIG. 1 shows a schematic diagram of a display interface of a handwritten note in an electronic book before format adjustment of the words in an electronic book.
Figure 2:
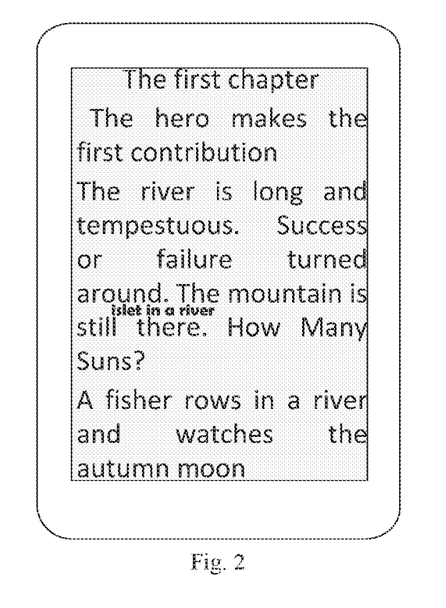
FIG. 2 shows a schematic diagram of a display interface of a handwritten note in an electronic book after format adjustment of the words in an electronic book in the prior art.

However, when using the above-mentioned method for displaying a handwritten note in the electronic book, after format adjustment (such as line spacing adjustment) of words of the electronic book, a disadvantage usually may be caused that the displayed text input by the user in the handwritten manner does not match the contents of the electronic book. As shown in FIG. 1, the user wrote the annotative text "islet in a river" for "fisher rows in a river" in the handwritten manner in the line spacing under the "fisher rows in a" in the electronic book; after the font of the electronic book is enlarged (i.e. the format adjustment of the words of the electronic book occurs), a display interface shown in FIG. 2 is presented, that is, when the position of the text written by the user in the handwritten manner in the screen of the electronic book terminal is recorded in the prior art, the positions and the sizes of the text "islet in a river" in FIG. 2 and the text "islet in a river" in FIG. 1 relative to the screen both do not change, so that after the font is enlarged, the text "islet in a river" corresponds to "around. The" in the electronic book, that is, the displayed text written by the user in the handwritten manner does not match the corresponding contents of the electronic book, thereby making user feel bad and reducing the amount of users.

SUMMARY

In view of the above problem, the present disclosure is proposed in order to provide a method for displaying a handwritten note in an electronic book, an electronic device and a computer storage medium which overcome the above problem or at least partially solve the above problem.

According to one aspect of the present disclosure, a method for displaying a handwritten note in an electronic book is provided, the handwritten note including a handwritten text, the method including:

acquiring a handwritten text input by a user, recording a specific word in the electronic book corresponding to the handwritten text and a relative position of the handwritten text with respect to the specific word;

when format adjustment of words in the electronic book is monitored, determining a new position of the specific word after the format adjustment;

obtaining a new display position of the handwritten text based on the new position of the specific word and the recorded relative position of the handwritten text with respect to the specific word; and determining a display manner of the handwritten text based on the new display position of the handwritten text.

According to another aspect of the present disclosure, an electronic device is provided, wherein the electronic device includes: at least one processor; and at least one memory, the at least one memory storing executable instructions that upon execution cause the at least one processor to perform operations, the operations comprising:

acquiring a handwritten text input by a user, recording a specific word in the electronic book corresponding to the handwritten text and a relative position of the handwritten text with respect to the specific word;

when format adjustment of words in the electronic book is monitored, determining a new position of the specific word after the format adjustment;

obtaining a new display position of the handwritten text based on the new position of the specific word and the recorded relative position of the handwritten text with respect to the specific word; and determining a display manner of the handwritten text based on the new display position of the handwritten text.

According to further another aspect of the present disclosure, a non-volatile computer-readable storage medium is provided, in which at least one executable instruction is stored, wherein the executable instruction is configured to cause a processor to execute operations, the operations comprising:

acquiring a handwritten text input by a user, recording a specific word in the electronic book corresponding to the handwritten text and a relative position of the handwritten text with respect to the specific word;

when format adjustment of words in the electronic book is monitored, determining a new position of the specific word after the format adjustment;

obtaining a new display position of the handwritten text based on the new position of the specific word and the recorded relative position of the handwritten text with respect to the specific word; and determining a display manner of the handwritten text based on the new display position of the handwritten text.

According to yet another aspect of the present disclosure, a computer program product is further provided, which includes a computing program stored on the above described non-volatile computer-readable storage medium.

According to the method for displaying a handwritten note in an electronic book, the electronic device and the computer storage medium provided by the present disclosure, acquiring a handwritten text input by a user, recording a specific word in the electronic book corresponding to the handwritten text and a relative position of the handwritten text with respect to the specific word; when format adjustment of words in the electronic book is monitored, determining a new position of the specific word after the format adjustment; obtaining a new display position of the handwritten text based on the new position of the specific word and the recorded relative position of the handwritten text with respect to the specific word; determining a display manner of the handwritten text based on the new display position of the handwritten text. With the present solution, after the format of the words in the electronic book is adjusted, the handwritten notes of the user can be displayed in a position that matches the contents in the electronic book, which improves the adaptability of the displayed handwritten notes and the contents in the electronic book, thereby improving user experience and increasing the amounts of users.

The above description is only an overview of the technical solutions of the present disclosure. In order to enable clearer understanding of the technical means of the present disclosure, so as to be able to be implemented in accordance with the contents of the description, and in order to make the above and other objects, features and advantages of the present disclosure more comprehensible, specific embodiments of the present disclosure are enumerated below.

BRIEF DESCRIPTION OF THE DRAWINGS

Various other advantages and benefits will become apparent to those ordinary skilled in the art upon reading the following detailed description of the preferred embodiments below. The drawings are only for the purpose of illustrating the preferred embodiments, and are not to be considered as limiting the present disclosure. Moreover, the same components are denoted with the same reference numerals throughout the drawings. In the drawings.

DETAILED DESCRIPTION

Exemplary embodiments of the present disclosure will be described in more detail below with reference to the drawings. Although the exemplary embodiments of the present disclosure are shown in the drawings, it should be understood that the present disclosure can be implemented in various forms and should not be limited by the embodiments set forth herein. On the contrary, these embodiments are provided in order to enable a thorough understanding of the present disclosure, and to enable a full conveyance of the scope of the present disclosure to those skilled in the art.

Figure 3:
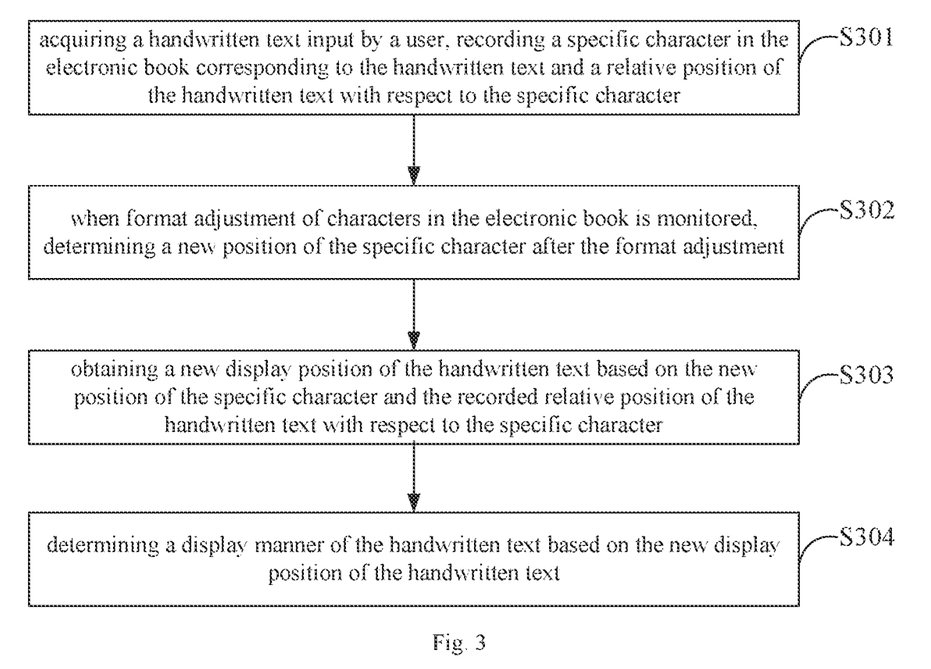
FIG. 3 shows a schematic flowchart diagram of a method for displaying a handwritten note in an electronic book provided according to an embodiment of the present disclosure.

FIG. 3 shows a schematic flowchart diagram of a method for displaying a handwritten note in an electronic book provided according to an embodiment of the present disclosure, wherein the handwritten note includes a handwritten text. As shown in FIG. 3, the method includes step S301-S304.

Step S301, acquiring a handwritten text input by a user, recording a specific word in the electronic book corresponding to the handwritten text and a relative position of the handwritten text with respect to the specific word.

After a handwritten text is input in an electronic book by a user, the handwritten text is acquired. And a specific word in the electronic book corresponding to the handwritten text is further determined and recorded. For example, a word in the electronic book, which is closest to the first word or the last word of the handwritten text, can be determined as the specific word in the electronic book corresponding to the handwritten text. As shown in FIG. 1, a handwritten text "islet in a river" is input under the words "A fisher rows in a river and watches" in the electronic book by the user, and then the word "fisher" in the electronic book, which is closest to the first word "islet" of the handwritten text, can be determined as the specific word in the electronic book corresponding to the handwritten text; or a word in the electronic book, which corresponds to a longitudinal center line of the bounding rectangle of the handwritten text, can be determined as the specific word in the electronic book corresponding to the handwritten text. As still shown in FIG. 1, the longitudinal center line of the bounding rectangle of the handwritten text corresponds to the word "rows" in the electronic book, and then the word "rows" in the electronic book can be determined as the specific word in the electronic book corresponding to the handwritten text. In short, the manner of determining the specific word can be set by a person skilled in the art, which is not limited in the present embodiment.

Furthermore, after the specific word in the electronic book corresponding to the handwritten text is determined and recorded, a relative position of the handwritten text with respect to the specific word is recorded, wherein the specific method for recording the relative position of the handwritten text with respect to the specific word is not limited in the present embodiment. Taking FIG. 1 as an example, when the specific word in the electronic book corresponding to the handwritten text "islet in a river" is determined as "fisher", the relative position of the handwritten text "islet in a river" with respect to the word "fisher" in the electronic book is recorded. For example, the position of the upper left vertex of the bounding rectangle of the handwritten text "islet in a river", with respect to the lower left vertex of the bounding rectangle of the word "fisher" in the electronic book, can be determined, thereby recording the relative position of the handwritten text with respect to the specific word.

Step S302, when format adjustment of words in the electronic book is monitored, determining a new position of the specific word after the format adjustment.

The format adjustment in the embodiment includes at least one of: font adjustment such as scaling font and adjusting spacing between the words, and paragraph adjustment such as adjusting indenting, adjusting line spacing and adjusting a gap between paragraphs.

Figure 4:
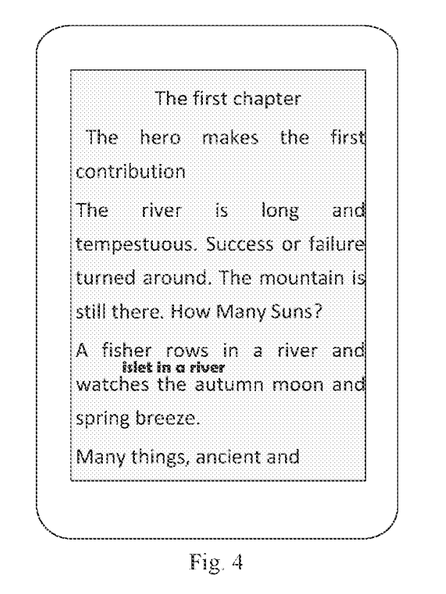
FIG. 4 shows a schematic diagram of a display interface of a handwritten note in an electronic book after format adjustment of the words in an electronic book in an embodiment of the present disclosure.

When format adjustment of the words in the electronic book is monitored, a new position of the specific word corresponding to the handwritten text after the format adjustment is determined. As shown in FIG. 4, when it is monitored that the font of the words in the electronic book is enlarged, the new position of the specific word "fisher" corresponding to the handwritten text "islet in a river" is determined.

Step S303, obtaining a new display position of the handwritten text based on the new position of the specific word and the recorded relative position of the handwritten text with respect to the specific word.

Based on the new position of the specific word determined in the step S302 and the relative position of the handwritten text with respect to the specific word recorded in the step S301, the new display position of the handwritten text can be accurately determined. As shown in FIG. 4, in the step S302, it is determined that the new position of the specific word "fisher" corresponding to the handwritten text "islet in a river" is (480, 960) (the upper left vertex of the screen of the electronic device is taken as the origin, the horizontal right direction is taken as the positive direction of the x-axis, and the vertical downward direction is taken as the positive direction of the y-axis). If the distance of the upper left vertex of the bounding rectangle of the handwritten text, to the lower left vertex of the specific word "fisher", which is recorded in the step S301, is (−10, 20), it is determined that the new display position of the upper left vertex of the bounding rectangle of the handwritten text after the format adjustment is (470, 980), thereby obtaining the new display position of the handwritten text.

Step S304, determining a display manner of the handwritten text based on the new display position of the handwritten text.

After the new display position of the handwritten text is obtained in the step S303, in order to further accurately restore the handwritten text, the display manner of the handwritten text can be determined based on the new display position of the handwritten text. As shown in FIG. 4, after the new display position of the handwritten text is determined, since the handwritten text can be completely displayed in the area corresponding to the new display position, it is determined that the display manner of the handwritten text is a complete display manner, that is, a display interface as shown in FIG. 4 is presented. Therefore, the problem is solved that the displayed handwritten text input by the user does not match the contents in the electronic book after the format adjustment of the words in the electronic book as in FIG. 2.

The method for displaying a handwritten note in an electronic book provided by the present embodiment comprises acquiring a handwritten text input by a user and recording a specific word in the electronic book corresponding to the handwritten text, and recording a relative position of the handwritten text with respect to the specific word in the present embodiment, which is different from recording the position of the handwritten text in the screen of the electronic device in the prior art; when format adjustment of words in the electronic book is monitored, determining a new position of the specific word after the format adjustment; obtaining a new display position of the handwritten text based on the new position of the specific word and the recorded relative position of the handwritten text with respect to the specific word; and determining a display manner of the handwritten text based on the new display position of the handwritten text. With the present solution, after the format of the words in the electronic book is adjusted, the handwritten notes of the user can be displayed in a position that matches the contents in the electronic book, which improves the adaptability of the displayed handwritten notes and the contents in the electronic book, thereby improving user experience and increasing the amounts of users.

Figure 5:
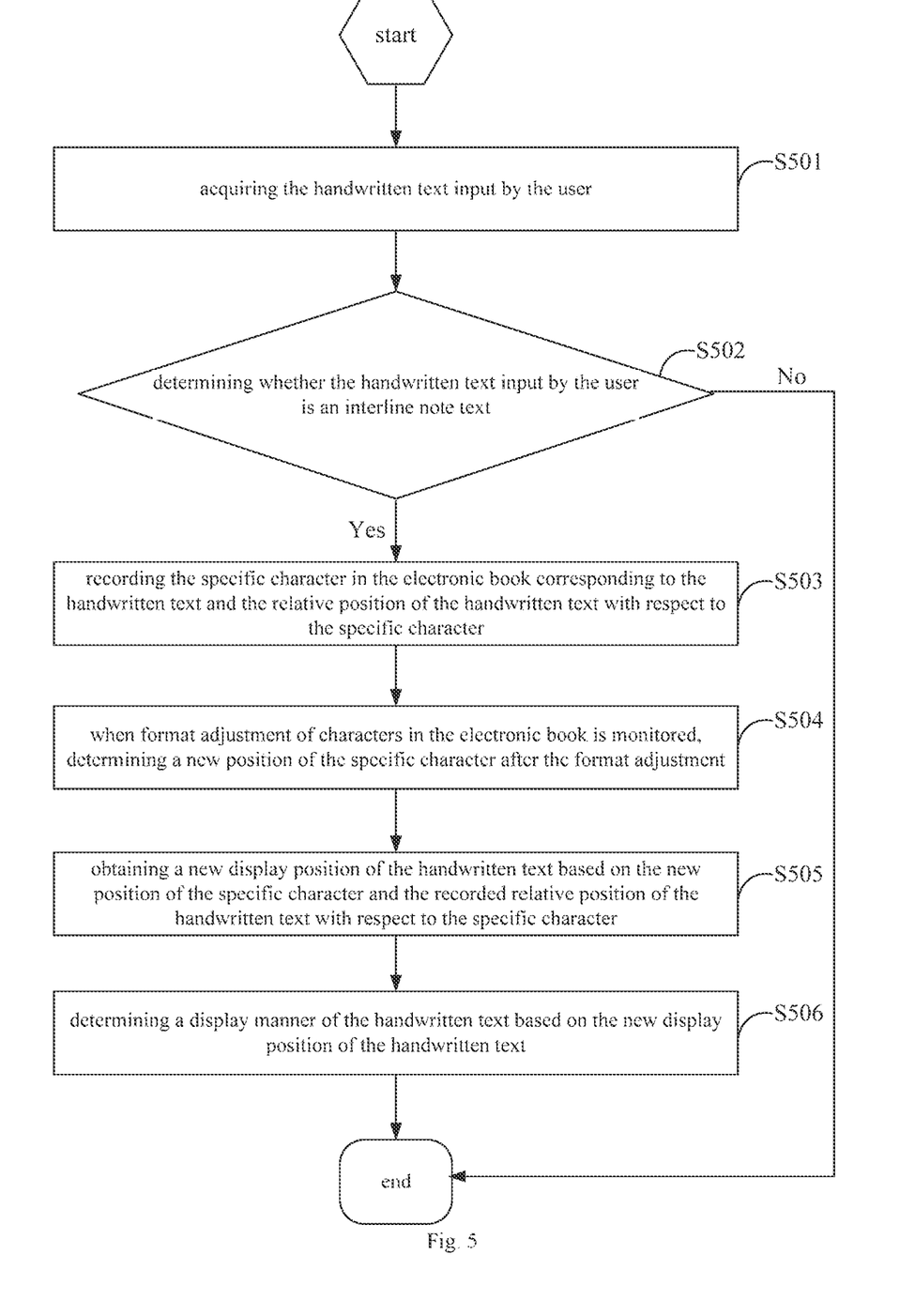
FIG. 5 shows a schematic flowchart diagram of a method for displaying a handwritten note in an electronic book provided according to another embodiment of the present disclosure.

FIG. 5 shows a schematic flowchart diagram of a method for displaying a handwritten note in an electronic book provided according to another embodiment of the present disclosure, wherein the handwritten note includes a handwritten text. As shown in FIG. 5, the method includes step S501-S506.

Step S501, acquiring the handwritten text input by the user.

In a specific implementation process, the user can input the handwritten text in the electronic device through a stylus or a finger or the like. After the user inputs the handwritten text, the handwritten text is acquired. Alternatively, after the handwritten text is acquired, the handwritten text can be stored in a format of picture.

Step S502 determining whether the handwritten text input by the user is an interline note text, if yes, a step S503 will be performed; otherwise, the present method ends.

After acquiring the handwritten text input by the user, it is further determined whether the handwritten text input by the user is an interline note text.

Specifically, in the procedure of determining whether the handwritten text input by the user is an interline note text, first a bounding rectangle of the handwritten text input by the user is built, and if the bounding rectangle of the handwritten text input by the user matches a bounding rectangle of a line spacing of the electronic book, it is determined that the handwritten text input by the user is an interline note text and the step S503 will further be performed; otherwise it is determined that the handwritten text input by the user is a non-interline note text and then the present method ends.

Figure 6A:
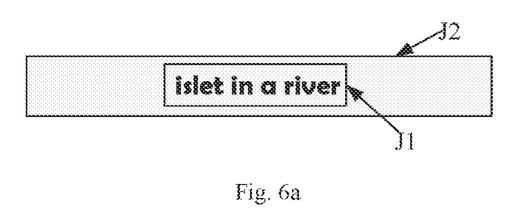
FIG. 6a shows a schematic diagram of a display interface of a line spacing rectangle and a bounding rectangle of a handwritten text in another embodiment of the present disclosure.
Figure 6B:
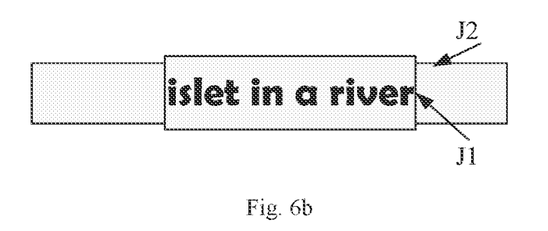
FIG. 6b shows a schematic diagram of another display interface of a line spacing rectangle and a bounding rectangle of a handwritten text in another embodiment of the present disclosure.

Alternatively, in the procedure of determining whether the bounding rectangle of the handwritten text matches the bounding rectangle of the line spacing of the electronic book, a matching threshold can be preset. If a ratio of the area of the overlapping region of the bounding rectangle of the handwritten text with the bounding rectangle of a certain line spacing of the electronic book, to the area of the bounding rectangle of the handwritten text, is greater than or equal to the preset matching threshold, it is determined that the bounding rectangle of the handwritten text matches the bounding rectangle of the line spacing of the electronic book, wherein the preset matching threshold can be set by a person skilled in the art according to actual operation conditions. For example, when the preset matching threshold is 100%, the bounding rectangle J1 of the handwritten text "islet in a river" in FIG. 6a is completely located in the rectangle J2 of the line spacing, and the ratio of the area of the overlapping portion of J1 with J2, to the area of J1, is equal to 100%, and then it is determined that the bounding rectangle of the handwritten text matches the bounding rectangle of the line spacing of the electronic book. And the ratio of the area of the overlapping portion of J1 with J2, to the area of J1, in FIG. 6b, is smaller than 100%, and then it is determined that the bounding rectangle of the handwritten text does not match the bounding rectangle of the line spacing of the electronic book. When the preset matching threshold is 70%, because the ratio of the area of the overlapping portion of J1 with J2, to the area of J1, in FIG. 6a, is equal to 100%, which is larger than 70%, then it is determined that the bounding rectangle of the handwritten text matches the bounding rectangle of the line spacing of the electronic book. The ratio of the area of the overlapping portion of J1 with J2, to the area of J1, in FIG. 6b, is 80%, which is also larger than 70%, then it is determined that the bounding rectangle of the handwritten text matches the bounding rectangle of the line spacing of the electronic book.

Step S503, recording the specific word in the electronic book corresponding to the handwritten text and the relative position of the handwritten text with respect to the specific word.

First, the specific word in the electronic book corresponding to the handwritten text is determined. Specifically, a word in the electronic book, which is closest to the first word of the handwritten text, can be determined as the specific word in the electronic book corresponding to the handwritten text.

In a specific implementation process, because the handwritten text is input by the user, the first word of the handwritten text input by the user needs to be determined first. After the first word of the handwritten text input by the user is determined, the bounding rectangle of the first word of the handwritten text is further built, and when the bounding rectangle of a word in the electronic book intersects the bounding rectangle of the first word of the handwritten text, it is determined that the word is the specific word in the electronic book corresponding to the handwritten text; or when the distance between the bounding rectangle of the word in the electronic book and the bounding rectangle of the first word of the handwritten text is less than a preset threshold, it is determined that that the word is the specific word in the electronic book corresponding to the handwritten text. As shown in FIG. 1, the first word of the handwritten text "islet in a river" is "islet", and the distance between the bounding rectangle of the first word "islet" and the bounding rectangle of the word "fisher" in the electronic book is less than a preset threshold, and then it is determined that the word "fisher" in the electronic book is the specific word in the electronic book corresponding to the handwritten text "islet in a river".

Figure 7:
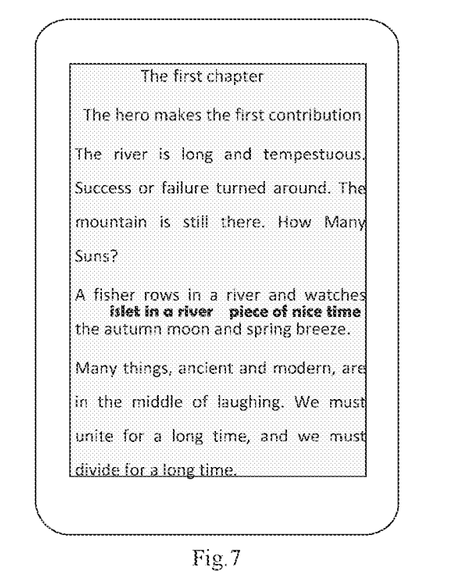
FIG. 7 shows a schematic diagram of a display interface of a handwritten note in an electronic book before format adjustment of the words in an electronic book in another embodiment of the present disclosure.
Figure 8:
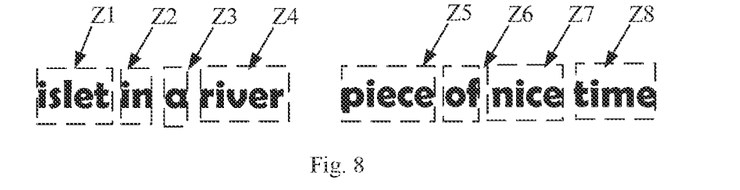
FIG. 8 shows a schematic diagram of a handwritten text splitting method in another embodiment of the present disclosure.

Alternatively, since in a specific implementation process, the user may write a plurality of handwritten texts in the same line spacing of the electronic book. As shown in FIG. 7, the user wrote the handwritten text "islet in a river" and the handwritten text "piece of nice time" in the same line spacing. In this case the handwritten texts in the same line spacing needs to be split. Specifically, the letters written in the same line spacing can be collected into a word. For example, if at least one of conditions is fulfilled, that the bounding rectangles of the adjacent plurality of letters intersect, and that the distance between the bounding rectangles of the adjacent plurality of letters is smaller than the first preset distance, the plurality of letters are collected into one word. If the distance between the bounding rectangles of the two adjacent letters is larger than a second preset distance, the two adjacent words are divided, thereby achieving the splitting of the handwritten text. As shown in FIG. 8, after the letters input by the user are collected, 8 words of Z1-Z8 are obtained in total, and the distance between the words Z4 and the word Z5 is relatively large and greater than the second preset distance, then the words Z4 and the word Z5 are divided, and the two handwritten texts are obtained, which are the handwritten text "islet in a river" and the handwritten text "piece of nice time". And the specific words in the electronic book corresponding to the two handwritten texts are determined, respectively.

Second, after the specific word in the electronic book corresponding to the handwritten text is determined, the specific word in the electronic book corresponding to the handwritten text and the relative position of the handwritten text with respect to the specific word are recorded. Optionally, since each word in the electronic book has an index ID corresponding thereto, through the index ID, the corresponding word can be located quickly and uniquely. For example, through the index ID "the first word of the first paragraph" in the electronic book "The Romance of the Three Kingdoms", the first word "The" in the electronic book "The Romance of the Three Kingdoms" can be located quickly and accurately. Therefore, in this step, the index ID of the specific word in the electronic book corresponding to the handwritten text in the electronic book can be recorded. As shown in FIG. 7, the index ID "the second word of the third paragraph" of the specific word "fisher" in the electronic book corresponding to the handwritten text "islet in a river", and the index ID "the sixth word of the third paragraph" of the specific word "river" in the electronic book corresponding to the handwritten text "piece of nice time" can be recorded. Further optionally, when recording the relative position of the handwritten text with respect to the specific word, a position of one or more vertices of the bounding rectangle of the handwritten text with respect to a certain vertex of the bounding rectangle of the specific word can be recorded. For example, taking FIG. 7 as an example, if the specific word in the electronic book corresponding to the handwritten text "islet in a river" is determined as "fisher", the position of the upper left vertex of the bounding rectangle of the handwritten text "islet in a river", with respect to the lower left vertex of the bounding rectangle of the word "fisher" in the electronic book, is recorded, thereby recording the relative position of the handwritten text with respect to the specific word.

Step S504, when format adjustment of words in the electronic book is monitored, determining a new position of the specific word after the format adjustment.

Because a change of the position of the specific word in the electronic book will not be caused when at least one of the following occurs: transiting font type (such as from KaiTi to SimSun), changing color (such as from black to white), bolding font, italicizing and the like of the words in the electronic book, the format adjustment in the present embodiment may only refer to the format adjustment which can cause a change of the position of the specific word, such as at least one of: scaling font, adjusting spacing between the words, adjusting indenting, adjusting line spacing, adjusting a gap between paragraphs, and the like.

Figure 9:
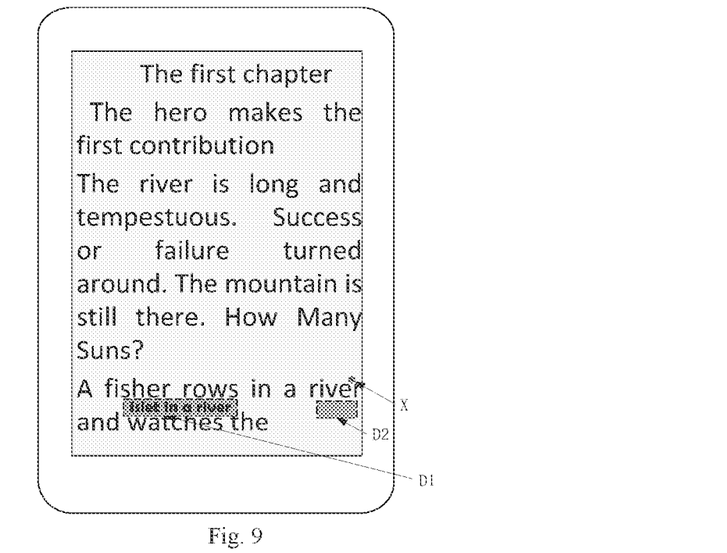
FIG. 9 shows a schematic diagram of a display interface of a handwritten note in an electronic book after format adjustment of the words in an electronic book in another embodiment of the present disclosure.

When the format adjustment of the words in the electronic book is monitored, a new display position of the specific word corresponding to the handwritten text after the format adjustment is determined. Since the index ID of the specific word of corresponding to the handwritten text is recorded in the step S503, in this step, a new position of the specific word after the format adjustment can be rapidly determined based on the recorded index ID of the specific word. Taking FIG. 7 and FIG. 9 as example, when it is monitored that the font of the words in the electronic book is changed from FIG. 7 to FIG. 9 (that is, the font is enlarged), the new position of the specific word "fisher" corresponding to the handwritten text "islet in a river", and the new position of the specific word "river" corresponding to the handwritten text "piece of nice time" are determined.

Step S505, obtaining a new display position of the handwritten text based on the new position of the specific word and the recorded relative position of the handwritten text with respect to the specific word.

Based on the new position of the specific word determined in the step S504 and the relative position of the handwritten text with respect to the specific word recorded in the step S503, the new display position of the handwritten text can be accurately determined. Taking FIG. 7 and FIG. 9 as example, in the step S504, it is determined that the new position of the lower left vertex of the bounding rectangle of the specific word "fisher" corresponding to the handwritten text "islet in a river" is (480, 960) (the upper left vertex of the screen of the electronic device is taken as the origin, the horizontal right direction is taken as the positive direction of the x-axis, and the vertical downward direction is taken as the positive direction of the y-axis), and the new position of the lower left vertex of the bounding rectangle of the specific word "river" corresponding to the handwritten text "piece of nice time" is (920, 960). If the distance of the upper left vertex of the bounding rectangle of the handwritten text "islet in a river", to the lower left vertex of the specific word "fisher", which is recorded in the step S503, is (−10, 20), and the distance of the upper left vertex of the bounding rectangle of the handwritten text "piece of nice time", to the lower left vertex of the specific word "river" is (0, 0), it is determined that the new display position of the upper left vertex of the bounding rectangle of the handwritten text "islet in a river" after the format adjustment is (470, 980), thereby obtaining the new display position of "islet in a river", and the new display position of the upper left vertex of the bounding rectangle of the handwritten text "piece of nice time" is (920, 960), thereby obtaining the new display position of "piece of nice time".

Step S506, determining a display manner of the handwritten text based on the new display position of the handwritten text.

In an alternative embodiment, the handwritten text is displayed in a folded manner when an area corresponding to the new display position of the handwritten text is insufficient to completely display the handwritten text; or the handwritten text is displayed in a non-folded manner when the area corresponding to the new display position of the handwritten text is sufficient to completely display the handwritten text. Taking FIG. 9 as example, the new display position of the upper left vertex of the bounding rectangle of the handwritten text "islet in a river" is (470, 980), the new display position of the handwritten text "islet in a river" is the region shown by D1, this region is sufficient to completely display the handwritten text "islet in a river", and then the handwritten text is completely displayed in this region in a non-folded manner; while the new display position of the upper left vertex of the bounding rectangle of the handwritten text "piece of nice time" is (920, 960), and the bounding rectangle thereof has the width of 300 and the height of 80, and the upper right vertex of the bounding rectangle of the handwritten text "piece of nice time" shall be (1220, 960), and however because the width of the screen in the electronic device is 1080, the region corresponding to the new display position of the handwritten text "piece of nice time" is the region shown by D2, and this region is insufficient to display the handwritten text "piece of nice time", and then a folding mark X is displayed at the upper right of the word "river", and when the user clicks the folding mark X, the handwritten text "piece of nice time" is completely displayed in the display interface.

Figure 10:
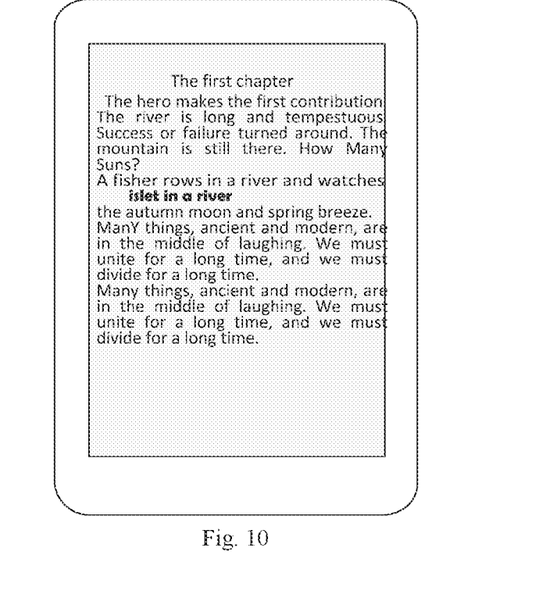
FIG. 10 shows a schematic diagram of another display interface of a handwritten note in an electronic book after format adjustment of the words in an electronic book in another embodiment of the present disclosure.

In another alternative embodiment, according the new display position of the handwritten text, it is possible to perform no format adjustment of the line spacing associated with the handwritten text and to display the handwritten text in a non-folded manner. As shown in FIG. 10, when the line spacing in the electronic book is adjusted, it is possible to perform no adjustment of the line spacing, in which the handwritten text is located, and to completely display the handwritten text in that line spacing.

Alternatively, in the procedure of displaying the handwritten text in a non-folded manner, it is possible to perform no adjustment of the handwritten text and to directly display the handwritten text, or it is also possible to display the handwritten text in the non-folded manner after the handwritten text is scaled.

The method for displaying a handwritten note in an electronic book provided by the present embodiment comprises acquiring a handwritten text input by a user, and determining whether the handwritten text is an interline note text, and if so, recording a specific word in the electronic book corresponding to the handwritten text, and recording a relative position of the handwritten text with respect to the specific word in the present embodiment, which is different from recording the position of the handwritten text in the screen of the electronic device in the prior art; when format adjustment of words in the electronic book is monitored, determining a new position of the specific word after the format adjustment; obtaining a new display position of the handwritten text based on the new position of the specific word and the recorded relative position of the handwritten text with respect to the specific word; determining a display manner of the handwritten text based on the new display position of the handwritten text. With the present solution, after the format of the words in the electronic book is adjusted, the handwritten notes of the user can be displayed in a position that matches the contents in the electronic book, which improves the adaptability of the displayed handwritten notes and the contents in the electronic book, thereby improving user experience and increasing the amounts of users; and in the present embodiment, a suitable display manner can be selected based on the new display position of the words in the electronic book, thereby further improving the display effect of the handwritten text and improving the user experience.

According to an embodiment of the present disclosure, a non-volatile computer-readable storage medium is provided, in which at least one executable instruction is stored, and the computer executable instruction may execute the method in any of the above described method embodiments.

The executable instruction may specifically be configured to cause a processor to perform operations of:

acquiring a handwritten text input by a user, recording a specific word in the electronic book corresponding to the handwritten text and a relative position of the handwritten text with respect to the specific word;

when format adjustment of words in the electronic book is monitored, determining a new position of the specific word after the format adjustment;

obtaining a new display position of the handwritten text based on the new position of the specific word and the recorded relative position of the handwritten text with respect to the specific word; and determining a display manner of the handwritten text based on the new display position of the handwritten text.

In an optional embodiment, the executable instruction may specifically be configured to cause the processor to perform operations of:

acquiring the handwritten text input by the user;

determining whether the handwritten text input by the user is an interline note text; and if so, recording the specific word in the electronic book corresponding to the handwritten text and the relative position of the handwritten text with respect to the specific word.

In an optional embodiment, the executable instruction may specifically be configured to cause the processor to perform operations of:

acquiring a bounding rectangle of the handwritten text input by the user; and if the bounding rectangle of the handwritten text input by the user matches a bounding rectangle of a line spacing of the electronic book, determining that the handwritten text input by the user is the interline note text.

In an optional embodiment, the executable instruction may specifically be configured to cause the processor to perform operations of:

building a bounding rectangle of a first word of the handwritten text;

when the bounding rectangle of a word in the electronic book intersects the bounding rectangle of the first word of the handwritten text, determining that the word in the electronic book is the specific word in the electronic book corresponding to the handwritten text; or when a distance between the bounding rectangle of the word in the electronic book and the bounding rectangle of the first word of the handwritten text is less than a preset threshold, determining that the word in the electronic book is the specific word of the electronic book corresponding to the handwritten text.

In an optional embodiment, the executable instruction may specifically be configured to cause the processor to perform operations of:

recording an index ID of the specific word in the electronic book corresponding to the handwritten text; and determining the new position of the specific word after the format adjustment based on the recorded index ID of the specific word in the electronic book corresponding to the handwritten text.

In an optional embodiment, the executable instruction may specifically be configured to cause the processor to perform operation of:

displaying the handwritten text in a folded manner when an area corresponding to the new display position of the handwritten text is insufficient to completely display the handwritten text;

or displaying the handwritten text in a non-folded manner when the area corresponding to the new display position of the handwritten text is sufficient to completely display the handwritten text.

In an optional embodiment, the executable instruction may specifically be configured to cause the processor to perform operation of:

performing no format adjustment of the line spacing associated with the handwritten text and displaying the handwritten text in a non-folded manner.

In an optional embodiment, the executable instruction may specifically be configured to cause the processor to perform operation of:

displaying the handwritten text in the non-folded manner after the handwritten text is scaled.

Figure 11:
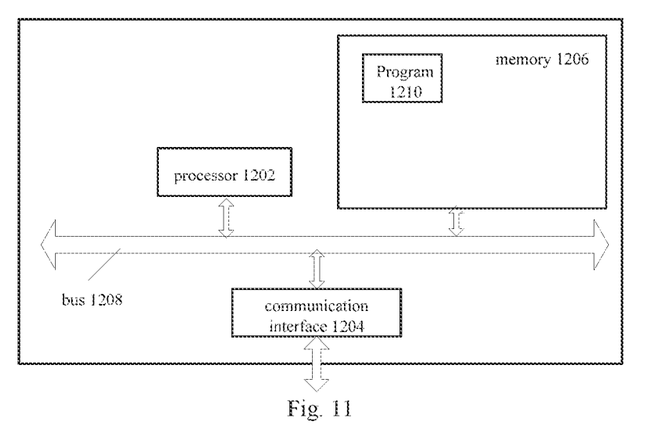
FIG. 11 shows a schematic diagram of the structure of an electronic device provided according to an embodiment of the present disclosure.

FIG. 11 shows a schematic diagram of a structure of an electronic device provided according to an embodiment of the present disclosure. The specific embodiment of the present disclosure does not limit the specific implementation of the electronic device.

As shown in FIG. 11, the electronic device may include: a processor 1202, a communication interface 1204, a memory 1206 and a communication bus 1208.

Wherein the processor 1202, the communication interface 1204 and the memory 1206 communicate with each other through the communication bus 1208. The communication interface 1204 is configured to communicate with a network element of another device, such as a client or another server. The processor 1202 is configured to execute a program 1210, and may specifically perform the related steps in the above described method embodiments.

The program 1210 may specifically be configured to cause the processor 1202 to perform operations of:

acquiring a handwritten text input by a user, recording a specific word in the electronic book corresponding to the handwritten text and a relative position of the handwritten text with respect to the specific word;

when format adjustment of words in the electronic book is monitored, determining a new position of the specific word after the format adjustment;

obtaining a new display position of the handwritten text based on the new position of the specific word and the recorded relative position of the handwritten text with respect to the specific word; and determining a display manner of the handwritten text based on the new display position of the handwritten text.

In an optional embodiment, the program 1210 may specifically be configured to cause the processor 1202 to perform operations of:

acquiring the handwritten text input by the user;

determining whether the handwritten text input by the user is an interline note text; and if so, recording the specific word in the electronic book corresponding to the handwritten text and the relative position of the handwritten text with respect to the specific word.

In an optional embodiment, the program 1210 may specifically be configured to cause the processor 1202 to perform operations of:

acquiring a bounding rectangle of the handwritten text input by the user; and if the bounding rectangle of the handwritten text input by the user matches a bounding rectangle of a line spacing of the electronic book, determining that the handwritten text input by the user is the interline note text.

In an optional embodiment, the program 1210 may specifically be configured to cause the processor 1202 to perform operations of:

building a bounding rectangle of a first word of the handwritten text;

when the bounding rectangle of a word in the electronic book intersects the bounding rectangle of the first word of the handwritten text, determining that the word in the electronic book is the specific word in the electronic book corresponding to the handwritten text; or when a distance between the bounding rectangle of the word in the electronic book and the bounding rectangle of the first word of the handwritten text is less than a preset threshold, determining that the word in the electronic book is the specific word of the electronic book corresponding to the handwritten text.

In an optional embodiment, the program 1210 may specifically be configured to cause the processor 1202 to perform operations of:

recording an index ID of the specific word in the electronic book corresponding to the handwritten text; and determining the new position of the specific word after the format adjustment based on the recorded index ID of the specific word in the electronic book corresponding to the handwritten text.

In an optional embodiment, the program 1210 may specifically be configured to cause the processor 1202 to perform operation of:

displaying the handwritten text in a folded manner when an area corresponding to the new display position of the handwritten text is insufficient to completely display the handwritten text;

or displaying the handwritten text in a non-folded manner when the area corresponding to the new display position of the handwritten text is sufficient to completely display the handwritten text.

In an optional embodiment, the program 1210 may specifically be configured to cause the processor 1202 to perform operation of:

performing no format adjustment of the line spacing associated with the handwritten text and displaying the handwritten text in a non-folded manner.

In an optional embodiment, the program 1210 may specifically be configured to cause the processor 1202 to perform operation of:

displaying the handwritten text in the non-folded manner after the handwritten text is scaled.

The algorithms and displays provided herein are not inherently related to any particular computer, virtual system or other devices. Various general-purpose systems can also be together used based on the teaching herein. According to the above description, the structure required to construct such a system is obvious. Furthermore, the present disclosure is not directed to any particular programming language. It should be understood, that the contents of the present disclosure described herein may be implemented using various programming languages, and that the description of the specific language above is to disclose the best embodiment of the present disclosure.

In the description provided herein, numerous specific details are described. It is to be understood, however, that embodiments of the present disclosure may be practiced without these specific details. In some instances, well-known methods, structures and techniques have not been shown in detail, so as not to obscure the understanding of the description.

Similarly, it should be understood that, in order to simplify the present disclosure and help understanding of one or more of the various disclosed aspects, in the above description of exemplary embodiments of the present disclosure, respective features of the present disclosure are sometimes grouped together into a single embodiment, figure or description thereof. However, this disclosed method should not be construed to reflect the intention that, the present disclosure sought for protection claims more features than being expressly recited in each claim. Rather, as reflected in the following claims, the disclosed aspects are less than all features of the single embodiment disclosed previously. Thus, claims following a specific embodiment are hereby explicitly incorporated into that specific embodiment, with each claim standing on its own as a separate embodiment of the present disclosure.

Those skilled in the art can understand that, the modules in the device in an embodiment can be adaptively changed, and provided in one or more devices different from the embodiment. The modules or units or components in an embodiment may be combined into one module or unit or component, and furthermore, may be divided into a plurality of sub-modules or sub-units or sub-components. Except for at least some of such features or processes or units being mutually exclusive, all features disclosed in this specification (including the accompanying claims, abstract and drawings) and all processes or units of so disclosed any method or device may be combined in any combination. Unless expressly stated otherwise, each feature disclosed in this specification (including the accompanying claims, abstract and drawings) may be replaced by an alternative feature providing the same, equivalent or similar purpose.

In addition, those skilled in the art can understand that, although some embodiments described herein include certain features included in other embodiments and not other features, combinations of features of different embodiments are meant to be within the scope of the present disclosure and form different embodiments. For example, in the following claims, any one of the claimed embodiments can be used in any combination.

It should be noted that, the above-mentioned embodiments illustrate rather than limit the disclosure, and that those skilled in the art may design alternative embodiments without departing from the scope of the appended claims. In the claims, any reference sign placed between parentheses shall not be construed as limiting the claim. The word "comprising", "comprise" or "comprises" does not exclude the presence of elements or steps not listed in a claims. The word "a" or "an" preceding an element does not exclude the presence of a plurality of such elements. The present disclosure may be implemented by means of hardware including several distinct elements and by means of a suitably programmed computer. In unit claims listing several devices, several of these devices may be specifically embodied by the same hardware item. The use of the words first, second and third does not imply any order. These words can be interpreted as names.

What is claimed is:

1. A method for displaying a handwritten note in an electronic book, the handwritten note including a handwritten text, the method comprising:

acquiring a handwritten text input by a user;

determining whether the handwritten text comprises at least one interline note based at least in part on a bounding rectangle of a line spacing of the electronic book, wherein the determining whether the handwritten text comprises at least one interline note based at least in part on a bounding rectangle of a line spacing of the electronic book further comprises:
  determining whether a ratio of an overlapping area between a bounding rectangle of the handwritten text and the bounding rectangle of the line spacing to an area of the bounding rectangle of the handwritten text is greater than or equal to a predetermined threshold, and
  determining that the handwritten text comprises the at least one interline note based on a determination that the ratio of the overlapping area between the bounding rectangle of the handwritten text and the bounding rectangle of the line spacing to the area of the bounding rectangle of the handwritten text is greater than or equal to the predetermined threshold;
in response to the determining that the handwritten text comprises the at least one interline note, recording at least one index ID of at least one specific word in the electronic book corresponding to the at least one interline note comprised in the handwritten text and a relative position of the at least one interline note with respect to the at least one specific word;
in response to detecting format adjustment of words in the electronic book, determining a new position of the at least one specific word after the format adjustment based on the recorded at least one index ID of the at least one specific word, wherein the words in the electronic book comprise the at least one specific word in the electronic book corresponding to the at least one interline note, and wherein the format adjustment of the words in the electronic book comprises at least one of scaling font, adjusting spacing between the words, adjusting indentation, adjusting line spacing, or adjusting a gap between paragraphs;
obtaining a new display position of the at least one interline note based on the new position of the at least one specific word and the recorded relative position of the at least one interline note with respect to the at least one specific word; and
determining a display manner of the at least one interline note based on the new display position of the at least one interline note.

2. The method according to claim 1, further comprising:
building a bounding rectangle of a first word of the handwritten text;
when the bounding rectangle of a word in the electronic book intersects the bounding rectangle of the first word of the handwritten text, determining that the word in the electronic book is the specific word in the electronic book corresponding to the handwritten text; or
when a distance between the bounding rectangle of the word in the electronic hook and the bounding rectangle of the first word of the handwritten text is less than a preset threshold, determining that the word in the electronic book is the specific word of the electronic book corresponding to the handwritten text.

3. The method according to claim 1, further comprising:
displaying the handwritten text in a folded manner when an area corresponding to the new display position of the handwritten text is insufficient to completely display the handwritten text;
or displaying the handwritten text in a non-folded manner when the area corresponding to the new display position of the handwritten text is sufficient to completely display the handwritten text.

4. The method according to claim 1, further comprising:
performing no format adjustment of the line spacing associated with the handwritten text and displaying the handwritten text in a non-folded manner.

5. The method according to claim 3, wherein the displaying the handwritten text in the non-folded manner further comprises:
displaying the handwritten text in the non-folded manner after the handwritten text is scaled.

6. The method according to claim 4, further comprising:
displaying the handwritten text in the non-folded manner after the handwritten text is scaled.

7. The method according to claim 1, further comprising:
determining whether the handwritten text comprises a plurality of interline notes based on determining whether a distance between bounding rectangles of two adjacent words in the handwritten text is greater than a predetermined distance;
splitting the handwritten text into the plurality of interline notes in response to determining that the distance between the bounding rectangles of the two adjacent words in the handwritten text is greater than the predetermined distance; and
determining a plurality of specific words in the electronic book corresponding to the plurality of interline notes, respectively.

8. An electronic device, comprising:
at least one processor; and
at least one memory, the at least one memory storing executable instructions that upon execution cause the at least one processor to perform operations, the operations comprising:
acquiring a handwritten text input by a user;
determining whether the handwritten text comprises at least one interline note based at least in part on a bounding rectangle of a line spacing of the electronic book, wherein the determining whether the handwritten text comprises at least one interline note based at least in part on a bounding rectangle of a line spacing of the electronic book further comprises:
  determining whether a ratio of an overlapping area between a bounding rectangle of the handwritten text and the bounding rectangle of the line spacing to an area of the bounding rectangle of the handwritten text is greater than or equal to a predetermined threshold, and
  determining that the handwritten text comprises the at least one interline note based on a determination that the ratio of the overlapping area between the bounding rectangle of the handwritten text and the bounding rectangle of the line spacing to the area of the bounding rectangle of the handwritten text is greater than or equal to the predetermined threshold;
in response to the determining that the handwritten text comprises the at least one interline note, recording at least one index ID of at least one specific word in the electronic book corresponding to the at least one interline note comprised in the handwritten text and a relative position of the at least one interline note with respect to the at least one specific word;
in response to detecting format adjustment of words in the electronic book, determining a new position of the at least one specific word after the format adjustment based on the recorded at least one index ID of the at least one specific word, wherein the words in the electronic book comprise the at least one specific word in the electronic book corresponding to the at least one interline note, and wherein the format adjustment of the words in the electronic book comprises at least one of scaling font, adjusting spacing between the words, adjusting indentation, adjusting line spacing, or adjusting a gap between paragraphs;

obtaining a new display position of the at least one interline note based on the new position of the at least one specific word and the recorded relative position of the at least one interline note with respect to the at least one specific word; and determining a display manner of the at least one interline note based on the new display position of the at least one interline note.

9. The electronic device according to claim 8, wherein the operations further comprise:

building a bounding rectangle of a first word of the handwritten text;

when the bounding rectangle of a word in the electronic book intersects the bounding rectangle of the first word of the handwritten text, determining that the word in the electronic book is the specific word in the electronic book corresponding to the handwritten text; or when a distance between the bounding rectangle of the word in the electronic book and the bounding rectangle of the first word of the handwritten text is less than a preset threshold, determining that the word in the electronic book is the specific word of the electronic book corresponding to the handwritten text.

10. The electronic device according to claim 8, wherein the operations further comprise:

displaying the handwritten text in a folded manner when an area corresponding to the new display position of the handwritten text is insufficient to completely display the handwritten text;

or displaying the handwritten text in a non-folded manner when the area corresponding to the new display position of the handwritten text is sufficient to completely display the handwritten text.

11. The electronic device according to claim 8, wherein the operations further comprise:

performing no format adjustment of the line spacing associated with the handwritten text and displaying the handwritten text in a non-folded manner.

12. The electronic device according to claim 10, wherein the operations further comprise:

displaying the handwritten text in the non-folded manner after the handwritten text is scaled.

13. The electronic device according to claim 11, wherein the operations further comprise:

displaying the handwritten text in the non-folded manner after the handwritten text is scaled.

14. The electronic device according to claim 8, wherein the operations further comprise:

determining whether the handwritten text comprises a plurality of interline notes based on determining whether a distance between bounding rectangles of two adjacent words in the handwritten text is greater than a predetermined distance;

splitting the handwritten text into the plurality of interline notes in response to determining that the distance between the bounding rectangles of the two adjacent words in the handwritten text is greater than the predetermined distance; and determining a plurality of specific words in the electronic book corresponding to the plurality of interline notes, respectively.

15. A non-volatile computer readable storage medium storing at least one executable instruction, wherein the executable instruction is configured to cause a processor to perform operations of:

acquiring a handwritten text input by a user;

determining whether the handwritten text comprises at least one interline note based at least in part on a bounding rectangle of a line spacing of the electronic book, wherein the determining whether the handwritten text comprises at least one interline note based at least in part on a bounding rectangle of a line spacing of the electronic book further comprises:

determining whether a ratio of an overlapping area between a bounding rectangle of the handwritten text and the bounding rectangle of the line spacing to an area of the bounding rectangle of the handwritten text is greater than or equal to a predetermined threshold, and determining that the handwritten text comprises the at least one interline note based on a determination that the ratio of the overlapping area between the bounding rectangle of the handwritten text and the bounding rectangle of the line spacing to the area of the bounding rectangle of the handwritten text is greater than or equal to the predetermined threshold;

in response to the determining that the handwritten text comprises the at least one interline note, recording at least one index ID of at least one specific word in the electronic book corresponding to the at least one interline note comprised in the handwritten text and a relative position of the at least one interline note with respect to the at least one specific word;

in response to detecting format adjustment of words in the electronic book, determining a new position of the at least one specific word after the format adjustment based on the recorded at least one index ID of the at least one specific word, wherein the words in the electronic book comprise the at least one specific word in the electronic book corresponding to the at least one interline note, and wherein the format adjustment of the words in the electronic book comprises at least one of scaling font, adjusting spacing between the words, adjusting indentation, adjusting line spacing, or adjusting a gap between paragraphs;

obtaining a new display position of the at least one interline note based on the new position of the at least one specific word and the recorded relative position of the at least one interline note with respect to the at least one specific word; and determining a display manner of the at least one interline note based on the new display position of the at least one interline note.

16. The non-volatile computer readable storage medium according to claim 13, the operations further comprising:

determining whether the handwritten text comprises a plurality of interline notes based on determining whether a distance between bounding rectangles of two adjacent words in the handwritten text is greater than a predetermined distance;

splitting the handwritten text into the plurality of interline notes in response to determining that the distance between the bounding rectangles of the two adjacent words in the handwritten text is greater than the predetermined distance; and determining a plurality of specific words in the electronic book corresponding to the plurality of interline notes, respectively.

* * * * *